United States Patent
Turner et al.

(10) Patent No.: US 7,370,630 B2
(45) Date of Patent: May 13, 2008

(54) ENGINE WITH A PLURALITY OF OPERATING MODES INCLUDING OPERATION BY COMPRESSED AIR

(75) Inventors: James William Griffith Turner, Norfolk (GB); Jeffrey Allen, Norfolk (GB)

(73) Assignee: Lotus Cars Limited, Norwich, Norfolk (GB)

( * ) Notice: Subject to any disclaimer, the term of this patent is extended or adjusted under 35 U.S.C. 154(b) by 277 days.

(21) Appl. No.: 10/553,887

(22) PCT Filed: May 28, 2004

(86) PCT No.: PCT/GB2004/002268

§ 371 (c)(1),
(2), (4) Date: Feb. 23, 2006

(87) PCT Pub. No.: WO2004/106713

PCT Pub. Date: Dec. 9, 2004

(65) Prior Publication Data

US 2006/0207257 A1 Sep. 21, 2006

(30) Foreign Application Priority Data

May 28, 2003 (GB) ................... 0312201.7

(51) Int. Cl.
*F01B 29/04* (2006.01)
(52) U.S. Cl. ..................................... 123/299
(58) Field of Classification Search ............... 123/299, 123/305, 478, 399, 432; 60/276, 712
See application file for complete search history.

(56) References Cited

U.S. PATENT DOCUMENTS

| | | | |
|---|---|---|---|
| 3,958,900 A | 5/1976 | Ueno | |
| 3,963,379 A | 6/1976 | Ueno | |
| 4,211,074 A * | 7/1980 | Hattori | 60/276 |
| 4,928,648 A * | 5/1990 | Schatz et al. | 123/478 |
| 5,101,622 A * | 4/1992 | Bond | 60/246 |
| 5,404,852 A * | 4/1995 | Frankle | 123/321 |
| 5,529,549 A | 6/1996 | Moyer | |
| 5,695,430 A | 12/1997 | Moyer | |
| 5,992,390 A | 11/1999 | Moyer | |
| 6,041,808 A * | 3/2000 | Blanz | 137/118.06 |
| 6,223,846 B1 | 5/2001 | Schechter | |

FOREIGN PATENT DOCUMENTS

| | | |
|---|---|---|
| EP | 0134373 | 3/1985 |
| JP | 60001333 | 1/1985 |
| JP | 2-3507 A * | 1/1990 |
| JP | 7-102915 A * | 4/1995 |

* cited by examiner

*Primary Examiner*—Hieu T. Vo
(74) *Attorney, Agent, or Firm*—Fulwider Patton LLP (57) ABSTRACT

The present invention relates (with reference to FIG. 1) to an internal combustion engine in which a combustion chamber (12) can be connected to a reservoir (16) for storing compressed air. Gas flow control valve means (15) controls flow between the chamber (12) and reservoir (16) so that air pressurised in the chamber (12) can be relayed to charge the reservoir (16) and pressurised air can be delivered to the chamber (12) to drive piston (10). The chamber (12) is also used for combustion of fuel. The invention also relates to a valve mechanism for controlling the flow of pressurised air between the chamber (12) and reservoir (16), in which a balancing force is applied to the gas flow control valve (115) to cancel the force on the valve (115) arising from the pressure applied to the back face of the valve (115).

46 Claims, 3 Drawing Sheets

ENGINE WITH A PLURALITY OF OPERATING MODES INCLUDING OPERATION BY COMPRESSED AIR

RELATED APPLICATIONS

This application is a U.S. national phase of PCT/GB2004/002268, filed May 28, 2004, which claims priority from Great Britain Application Serial No. 0312201.7, filed May 28, 2003.

The present invention relates to an engine which can run as an internal combustion engine and which can run as a compressor to generate compressed air and which can also use stored compressed air previously generated to power the engine.

There has been considerable research into development of a vehicle with an engine which has zero emissions in certain operating conditions, e.g traffic conditions in cities. Much of the research has centred upon using a combination of an internal combustion engine with an electric motor, with the internal combustion engine being used outside cities to generate electricity which is stored for subsequent use in powering the electric motor in city use of the vehicle. When the electric motor is running alone there are zero emissions.

The present invention tackles the problem of providing an engine which can operate with zero emissions in a different manner.

The present invention in a first aspect provides an engine comprising a variable volume chamber; inlet valve means controlling admission of charge air into the variable volume chamber; fuel delivery means for delivering fuel to be mixed with the charge air admitted to the variable volume chamber; and exhaust valve means for controlling exhaust to atmosphere from the variable volume chamber of combusted gases resulting from combustion in the variable volume chamber of the fuel with the admitted charge air; wherein: the engine has a first operating mode in which the inlet valve means admits charge air into the variable volume chamber, the fuel delivery means delivers fuel which is mixed with the admitted charge air, the mixture of fuel and charge air is compressed by the variable volume chamber reducing in volume, the compressed mixture of fuel and air combusts, the combusted gases expand and force the variable volume chamber to increase in volume and the expanded combusted gases are exhausted to atmosphere from the variable volume chamber via the exhaust valve means; characterised in that: the engine additionally comprises a reservoir for storing compressed air which is connected to the variable volume chamber; and gas flow control valve means controlling flow of air between the variable volume chamber and the reservoir for storing compressed air; and characterised in that the engine has at least two additional operating modes: a second operating mode in which the inlet valve means admits charge air into the variable volume chamber, the admitted charge air is compressed by the variable volume chamber reducing in volume and the gas flow control valve means allows the compressed air to flow from the variable volume chamber to the reservoir to be stored therein; and a third operating mode in which the gas flow control valve means allows compressed air to flow from the reservoir into the variable volume chamber and thereafter expand to force the variable volume chamber to increase in volume, the expanded air subsequently being exhausted to atmosphere.

The present invention in a second aspect provides an engine comprising a plurality of variable volume chambers; inlet valve means controlling admission of charge air into the variable volume chambers; fuel delivery means for delivering fuel to be mixed with the charge air admitted to the variable volume chambers; and exhaust valve means for controlling exhaust to atmosphere from the variable volume chambers of combusted gases resulting from combustion in the variable volume chambers of the fuel with the admitted charge air; wherein the engine can operate at least one of the plurality of variable volume chambers in a plurality of different operating modes; and the engine can operate each variable volume chamber in a first operating mode in which the inlet valve means admits charge air into the variable volume chamber, the fuel delivery means delivers fuel which is mixed with the admitted charge air, the mixture of fuel and charge air is compressed by the variable volume chamber reducing in volume, the compressed mixture of fuel and air combusts, the combusted gases expand and force the variable volume chamber to increase in volume and the expanded combusted gases are exhausted to atmosphere from the variable volume chamber via the exhaust valve means; characterised in that: the engine additionally comprises: a reservoir for storing compressed air which is connected to at least one of the plurality of variable volume chambers; and gas flow control valve means controlling flow of gas between at least one of the variable volume chambers and the reservoir for storing compressed air; and characterised in that the engine can operate at least one of the plurality of variable volume chambers in at least two additional operating modes: a second operating mode in which the inlet valve means admits charge air into the variable volume chamber, the admitted charge air is compressed by the variable volume chamber reducing in volume and the gas flow control valve means allows the compressed air to flow from the variable volume chamber to the reservoir to be stored therein; and a third operating mode in which the gas flow control valve means allows compressed air to flow from the reservoir into the variable volume chamber and thereafter expand to force the variable volume chamber to increase in volume, the expanded air subsequently being exhausted to atmosphere.

In a third aspect of the present invention there is provided a method of operating an engine which has a plurality of variable volume chambers each defined by a piston reciprocating in a cylinder, the pistons being connected to a common mechanism for delivering power output from the engine, the method comprising operating the engine in a plurality of different modes of operation including a first operating mode in which a mixture of fuel and air is combusted in each variable volume chamber with expansion of combusted gases forcing the pistons to move and with the expanded combusted gases exhausted to atmosphere; the method being characterised by a second operating mode in which a mixture of fuel and air is combusted in at least a first variable volume chamber with expansion of combusted gases forcing the relevant piston to move and with the expanded combusted gases exhausted to atmosphere and in which in at least a second variable volume chamber air is compressed and then the compressed air is delivered to and stored in a reservoir of compressed air, and a third operating mode in which compressed air stored in the reservoir is admitted into at least one variable volume chamber and the admitted compressed air allowed to expand with the expanded air then exhausted to atmosphere.

The present invention in a fourth aspect provides a valve mechanism for controlling flow of pressurised gas into an engine cylinder of an internal combustion engine, the mechanism comprising: a poppet valve for opening and closing a transfer port in the cylinder through which gas can flow between a source of pressurised gas and the cylinder, the poppet valve having a valve head and a valve stem; drive means acting on the valve stem for driving the poppet valve to open the transfer port; and spring means for biassing the poppet valve to close the transfer port; characterised in that on the valve stem there is mounted a piston which is slidable in a valve stem chamber provided in the internal combustion engine and the valve stem chamber is connected to the source of pressurised gas whereby a force is applied to the piston by the pressurised gas in the valve stem chamber which counteracts a force applied on the poppet valve by exposure of a rear face of the valve head, facing away from the engine cylinder, to the pressurised gas from the source of pressurised gas.

A preferred embodiment of the present invention will now be described with reference to the accompanying drawings in which.

Figure 1:
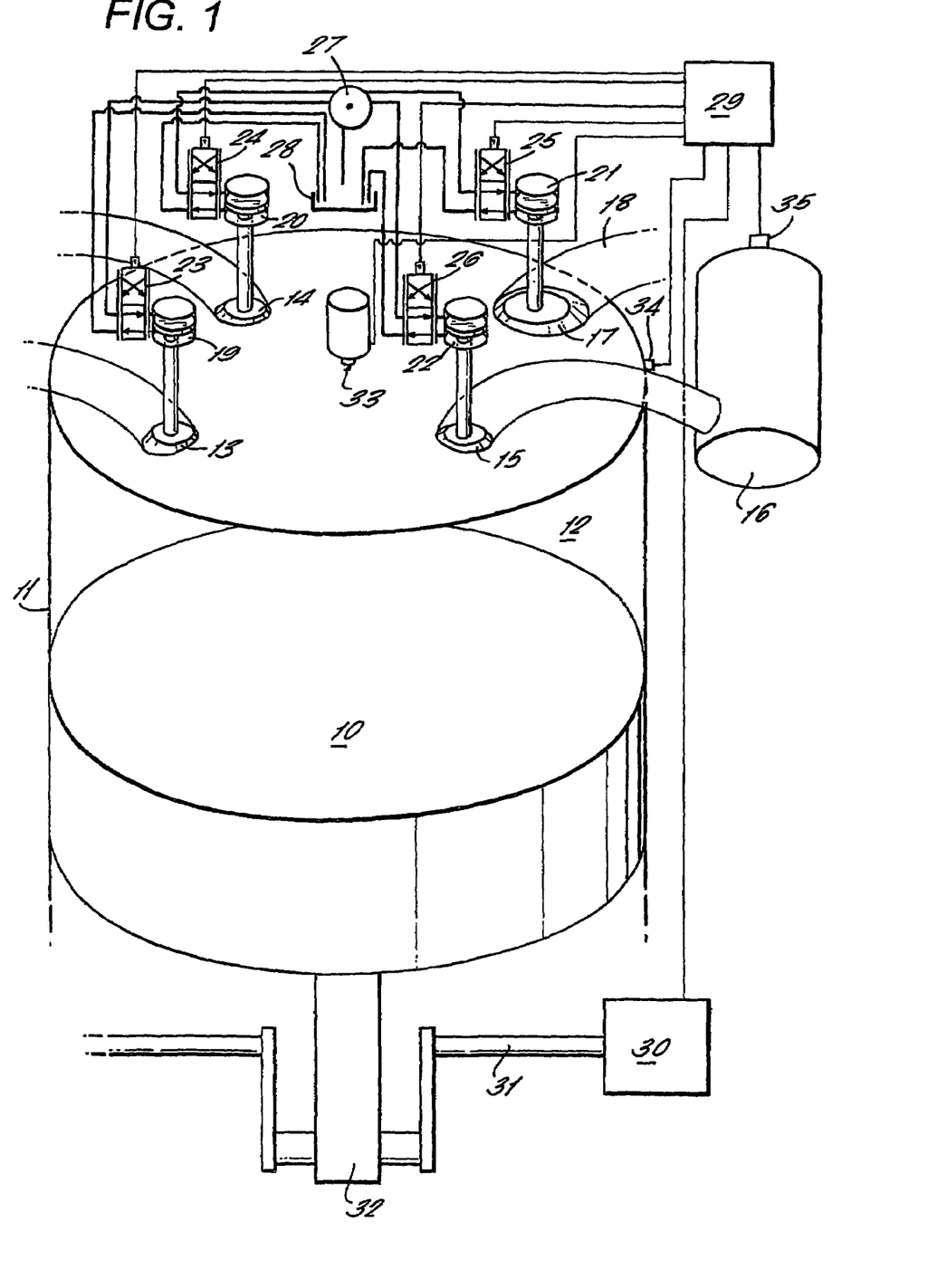
FIG. 1 is a schematic representation of one cylinder of a multi-cylinder internal combustion engine according to the present invention.
Figure 2:
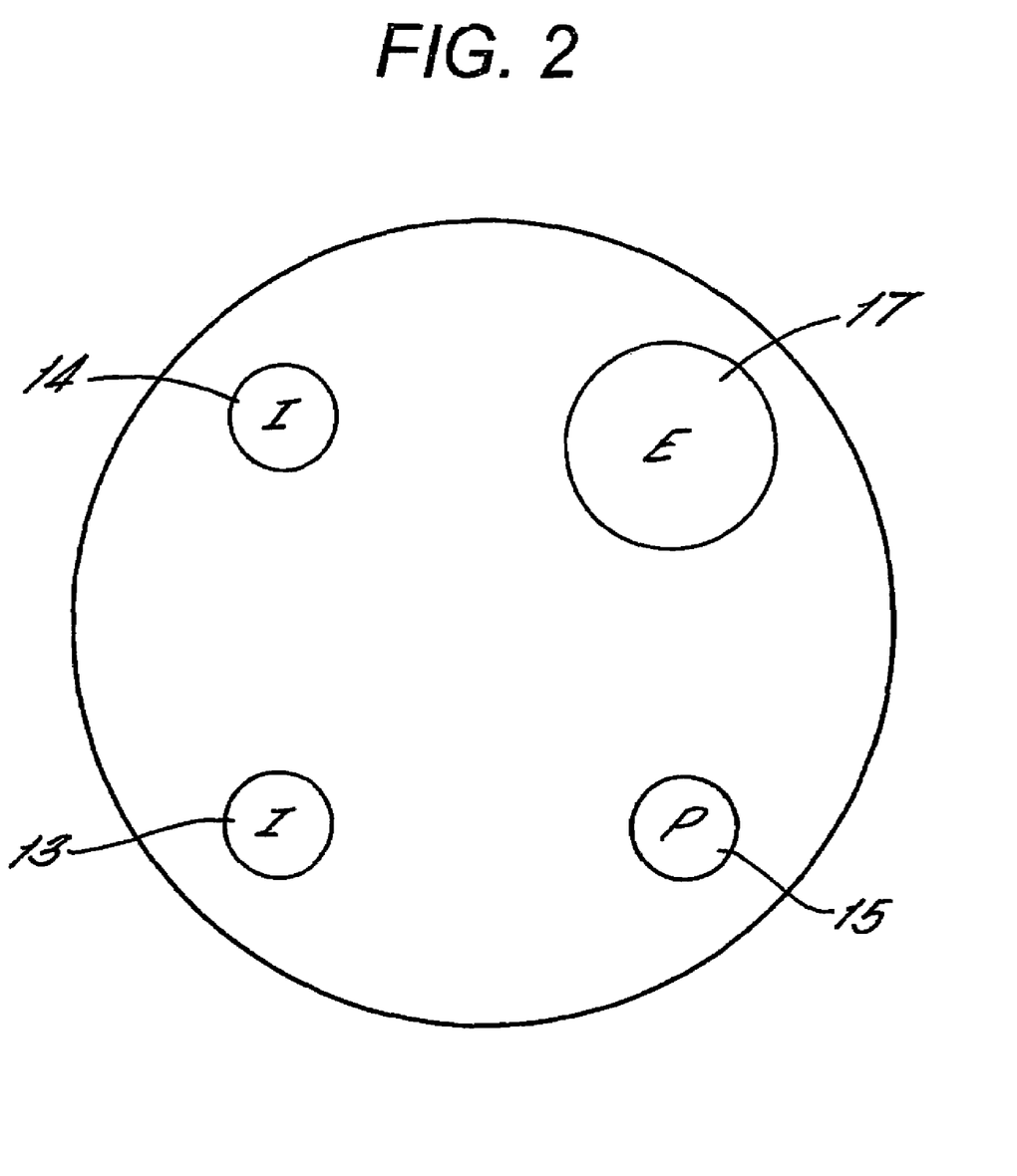
FIG. 2 is a schematic representation of the top surface of the combustion chamber shown in FIG. 1

In FIG. 1 there is shown a piston 10 which reciprocates in a cylinder 11 and defines therewith a variable volume combustion chamber 12. Two inlet valves 13 and 14 control flow of charge air into the combustion chamber 12. A gas flow control valve 15 controls flow of pressurised air to and from a pressure vessel 16, as will be described later. An exhaust valve 17 controls flow of combusted gases out of the combustion chamber through an exhaust passage 18 which relays the exhausted gases to atmosphere. An injector 33 delivers fuel into the combustion chamber and also comprises a spark plug.

The four valves 13, 14, 15 and 17 are connected one each to four hydraulic actuators 19, 20, 21 and 22 which open and close the valves 13, 14, 15 and 17 under the control of four electrically operated control valves 23, 24; 25, 26 associated one each with the actuators 19,20, 21 and 22. Each of the control valves 23, 24, 25, 26 is connected both to a source of pressurised hydraulic fluid 27 (e.g. a pump) and an exhaust for pressurised fluid (e.g. a sump from which fluid is drawn by the pump). The control valves 23, 24, 25, 26 are all controlled by electrical signals produced by an electronic controller 29 which produces control signals having regard to a plurality of engine operating parameters (as sensed by a plurality of sensors, not shown) and having regard to the position of the piston 10 in the cylinder 11 as sensed by a rotation sensor 30 connected to a crankshaft 31 driven to rotate by a connecting rod 32 connected to the piston 10.

Each control valve, e.g. 23, can connect an upper chamber of an associated actuator, e.g. 19, to receive pressurised fluid from the pump 27 whilst at the same time connecting a lower chamber of the associated actuator to return fluid to the sump 28, whereby the relevant valve, e.g. 13, is driven to open. Each control valve, e.g. 23, can also connect a lower chamber of an associated actuator, e.g. 19, to receive pressurised fluid from the pump 27 whilst connecting the upper chamber of the associated actuator to return fluid to the sump 28, whereby the relevant valve, e.g. 13, is driven to close.

The engine in which the piston 10 and cylinder 11 are located will have, for instance, three additional cylinders with three additional pistons reciprocating therein, the pistons all connected to the common crankshaft 31, and each having hydraulically actuated valves as described above, all of the valves being controlled by a common electronic controller 29.

The use of the engine described above in an automobile will now be described.

In normal operating conditions each cylinder of the engine will be operated according to a standard four-stroke cycle. In an intake stroke the inlet valves 13 and 14 will be opened to admit a charge air into the combustion chamber with the injector 33 injecting fuel into the admitted air and then the mixture of fuel and air being compressed in a subsequent compression stroke, then ignited by the spark plug 33 and then the ignited gases expanding in a power stroke with the exhaust valve 17 subsequently opened in an exhaust stroke to allow the combusted gases to be expelled from the combustion chamber. Throughout the four-stroke operation the controller 29 keeps the gas control valve 15 closed.

In part load/low load conditions, only two out of the four cylinders will be operated by a standard four-stroke cycle in the manner described above. The other two cylinders, e.g. cylinder 11, will be turned into compressors as now described. First of all, the existence of suitable part-load conditions will be detected by the controller 29 from the various signals received thereby. Then the controller 29 will control the actuators 19, 20, 21, 22 so that in each downstroke of the piston 10 the inlet valves 13 and 14 are opened to allow air to be drawn into the chamber 12. The injector 33 will be kept inactive so that in each upstroke the piston 10 will pressurise a charge of pure air in the chamber 12. The controller 29 will then open the gas control valve 15 during the upstroke to allow air pressurised in the chamber 12 to be expelled to the reservoir 16 which stores pressurised air.

When the engine is operated with two cylinders compressing air then the remaining cylinders operating each according to a four-stroke cycle will put work into the cylinders pressuring the air. By making the combustion cylinders work harder their emissions of NOx and hydrocarbons can be improved as compared with the situation in which all the cylinders operate a normal four-stroke cycle at part-load. The electronic controller 29 will evaluate what power output is needed from the engine for a given set of operating conditions and will then determine whether the required power can be provided by operating less than the full number of cylinders.

When the engine is decelerating and engine braking is required, then the electronic controller 29 can switch all the cylinders into a mode in which they operate as compressors as described above, each piston drawing in air in each downstroke and pressurising the air in a subsequent upstroke, with the pressurised air being expelled to the reservoir 16. The momentum of the vehicle will provide the energy for the compression of the air. The compression of the air will absorb the kinetic energy of the vehicle and thus slows the vehicle very effectively.

A pressure sensor 34 measures pressure of gases in the combustion chamber 12. A pressure sensor 35 measures pressure of stored compressed air in the reservoir 16. The pressure sensors 34 and 35 relay measured signals to the electronic controller 29 and the controller 29 will only open each gas control valve, e.g. 15, when the pressure of the compressed air in the variable volume chamber, e.g. 12, is greater than the pressure in the reservoir 16. When the reservoir 16 is fully pressurised then the electronic controller 29 will keep the gas control valves, e.g. 15, closed and will either keep all of the inlet and exhaust valves of a particular cylinder also closed with air trapped and the variable volume chamber functioning as a gas spring (this being preferable in part-load conditions when e.g. two cylinders are active and two cylinders are deactivated) or alternatively the electronic controller 29 will operate to open the inlet and exhaust valves in order to allow air to be compressed and then the compressed air vented to exhaust (this being preferable during vehicle deceleration conditions). Additionally, the compressed air could be vented to atmosphere via the air intake system under control of the inlet valves, e.g. 13, 14, since it is clean air. This would have the advantage of avoiding passing cool air through a catalytic converter in the engine's exhaust system (which could have the effect of lowering the temperature of the catalytic converter below its working temperature).

It is preferable that the vehicle in which the engine is operating has an automatic gearbox. The transmission will then automatically change to a low or the lowest gear ratio during braking of the vehicle so as to increase the rate of revolution of the engine and thus the work done to compress air and hence the regenerative braking effect. A continuously variable transmission would be ideal since the gear ratio would be continuously varied with vehicle speed. An electric transmission could be used but any automatic gearbox would suffice.

In the case of a four-wheel drive transmission, if the energy transfer rate exceeds the force necessary to lock up the wheels of one axle, the braking energy can still be shared between the other axle and the engine working as a compressor. A continuously variable transmission could also be configured to vary gear ratios to transmit more regenerative braking power when the brakes are applied (under control of an electronic management system).

When the engine is working as a compressor during braking then a two-stroke cycle will be used with air being drawn into each working cylinder with each downstroke of the piston in the cylinder and compressed air driven out of each working cylinder with each up stroke of the piston in the cylinder.

Once a store of compressed air has been built up in the reservoir 16 then the compressed air can be used to power the engine. Perhaps this can be done when the vehicle is initially started or when the vehicle is crawling along in traffic conditions. In such an operating mode the engine will operate as a pneumatic engine and the controller 29 will keep the inlet valves (e.g. 13,14) of each cylinder closed and will then control the opening and closing of the gas flow control valve 15 and the exhaust valve 17 so that compressed air is admitted into the chamber 12 from the reservoir 16 to force the piston 10 downwardly and then the expanded air is exhausted from the chamber 12 to the exhaust 18 in a subsequent upstroke. Alternatively the clean expanded air could be vented to atmosphere via the air intake system under control of the inlet valves, e.g. 13,14.

Since the stored energy of the compressed gas will be permanently available it is ideal to use the compressed gas on starting of the engine in order to start the vehicle in motion. This will help improve emissions because emissions are usually poor during starting of an engine. Furthermore, the stored compressed gas can allow clutchless starting of a vehicle. Whereas an internal combustion engine must be allowed to fire and rotate before it drives the vehicle, the pistons of the engine can be connected to the drive shaft during starting when compressed air is used to drive them and therefore a clutched operation is not necessary.

It is envisaged that when a vehicle moves off from stationary then perhaps the engine will be operated so that it starts in its pneumatic mode and then moves to a part-load condition in which two cylinders are operated pneumatically and the other two operated by a four-stroke internal combustion engine cycle and then all cylinders will be operated in with a four-stroke combustion cycle as the vehicle picks up speed.

With the engine of the present invention it is possible to eliminate the need for engine idling. When a vehicle stops then the engine can stop. When the vehicle needs to start moving again, the engine can be first operated in pneumatic mode, as described above. This can eliminate idling of an engine altogether and this will be very fuel-efficient.

The electronic controller 29 will continually monitor the level of stored gas in the reservoir 16 and will alter the operation of the engine to supply compressed gas to the reservoir whenever it is noted that the stored supply is depleted.

It is envisaged that the reservoir 16 will be a light plastic pressure vessel which will contain pressurised air in the range of 10-20 bar. The vessel will be sized to store compressed gas sufficient for a range of 3 to 5 miles of travel of the vehicle. A typical reservoir would store 140 litres of compressed air.

In a modification of the system described above, a secondary pump could be used to increase pressure of the compressed gas from the pressure of 20 bar supplied by the engine operating in pneumatic mode to a pressure of 200 bar. However, this would involve additional complexity in that there would have to be a heavier storage vessel (e.g. steel) and a separate compressor driven by the engine would have to be used.

As an alternative to use of a secondary pump to boost air pressure after the air is output from the cylinders, an engine-driven supercharger (or an electrically-driven supercharger) could be used to compress air before it is compressed in a cylinder of the engine.

In the above description of the engine operating when powered by compressed air, each working cylinder has been described as operating a two-stroke cycle, with compressed air expanding with each downstroke of a piston in a working cylinder and expanded air expelled with each upstroke of a piston of a working cylinder. However, a four-stroke cycle could be used in which for each working cylinder the inlet valves open for an intake stroke, the charge of air introduced via the inlet valves is then compressed in a compression stroke and then pressurised air is introduced into the working cylinder in a power stroke and expanded. Finally, the expanded air is exhausted from the working cylinder in an exhaust stroke, either to exhaust via the exhaust valve or to the intake system via the intake valve(s). The use of a four-stroke cycle could increase efficiency of the engine.

The pressurised air stored in the reservoir could be combusted in the cylinders rather than expanded in them, provided that a direct fuel injection system is used in which fuel is delivered directly to a working cylinder to be mixed with air in the cylinder. This has the capability of enhancing performance from a standing start of a vehicle powered by the engine of the present invention. Also, if the engine is turbo-charged then the use of pressurised air from the reservoir can reduce the lag typical with turbo-charged engines. To permit this possibility the engine will need to be operable with a four-stroke cycle in which in each intake stroke charge air is introduced into a cylinder via the gas control valve from the reservoir of pressurised air. The complete charge could be supplied from the reservoir or alternatively the inlet valves could be opened for the start of an intake stroke and then closed with the gas control valve opening in the latter part of the intake stroke to introduce air at boost pressure. The inlet valves and the gas control valve will not be opened simultaneously. When all of the charge air is supplied from the reservoir of pressurised air then the inlet valves will remain closed throughout the whole of each intake stroke.

With a multi-cylinder engine it may be possible to achieve double (or triple) compression and expansion. If the cylinders are connected together in a suitable way by conduits external to them then air could be compressed in a first cylinder to first level, then compressed in a second cylinder to a second higher level and then compressed in a third cylinder to a higher level still. Similarly; compressed air from the reservoir could be expanded in one cylinder to a first degree and then expelled with the expelled air expanded again in another cylinder to a second higher degree and finally with the twice expelled air expanded once more to a third degree in a further cylinder. This will only be possible in engines which have pistons phased in motion relative to each other in a particular way, but will raise efficiency where possible.

Whilst above the invention is described in the implementation in a piston engine, the invention could also be used in any rotary device, e.g. a rotary engine (such as a Wankel engine) or any other engine with a variable volume chamber can be used either as a combustion chamber or a compression chamber. Thus references to "strokes" in the description and claims should, in the case of e.g. a rotary engine, be understood to include references to increasing periods of increasing volume of a chamber and periods of decreasing volume of a chamber in engines which do not have a piston sliding in a cylinder. A "downstroke" should be understood to include an increasing volume period for a variable volume chamber in an engine without a piston. An "upstroke" should be understood to include a decreasing volume period in an engine without a piston.

Comparing a vehicle driven by the engine of the present invention with a vehicle driven by a combination of an internal combustion engine and electric motor, the present invention has the advantage of simplicity. There is no need for an electrical generator or for an electrical motor or for battery storage. Each of these items are also quite expensive and therefore the present invention has the advantage of low cost.

Figure 3:
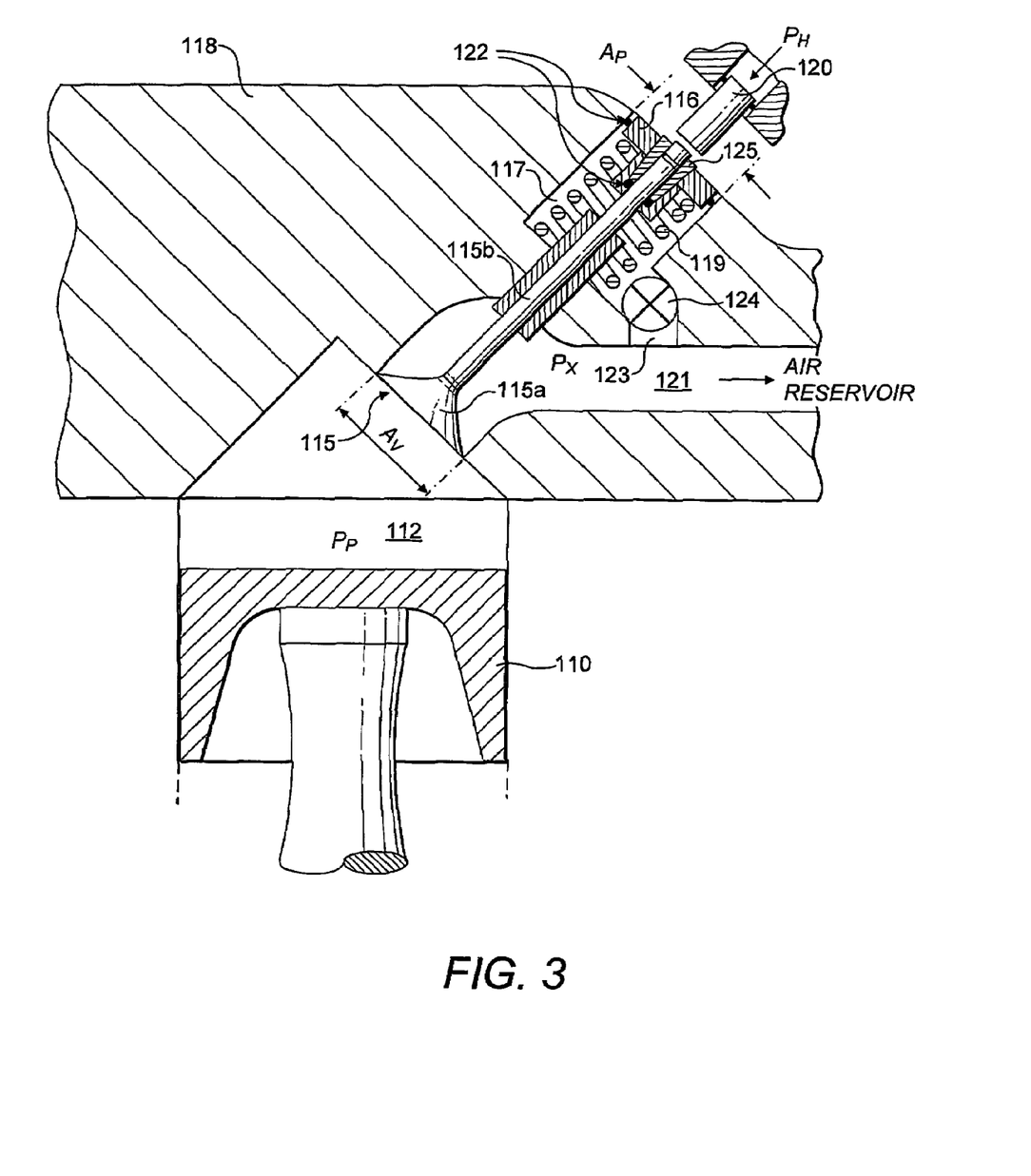
FIG. 3 shows a preferred valve mechanism for use in the internal combustion engine of FIG. 1 or FIG. 2.

FIG. 3 shows a preferred valve mechanism for use in the internal combustion engine as described above, to control flow of pressurised gas from a variable volume combustion chamber (e.g. 12) to the pressure vessel 16.

It is a problem to provide a valve mechanism for controlling flow of pressurise gas without having to have a very high spring load to hold the poppet valve (115 in FIG. 3) shut against the air pressure acting on the back face of the valve head 115A.

The valve mechanism comprises a balance piston 116 mounted on the valve stem 115 to move therewith. The balance piston 116 is slidable in a valve stem chamber 117 provided in the cylinder head 118. A spring 119 is provided in the valve stem chamber 117 and acts between a lower surface of the chamber 117 and the balance piston 116, in order to bias the poppet valve 115 into a position in which it closes a transfer port to prevent flow of air between the chamber 112 and the air reservoir (not shown in FIG. 3).

Also in FIG. 3 there can be seen an actuator piston 120 of a hydraulic actuator which can impinge on the end of the valve stem 115 in order to open the poppet valve 115 to allow flow of air between the combustion chamber 112 and the air reservoir, along the transfer passage 121. Seals 122 can be seen in the Figure which prevent flow of air out of the valve stem chamber 117 past the balance piston 16.

The valve stem chamber 117 is connected to the transfer passage 121 by a connecting passage 123 in which there is located an isolating valve 124, the operation of which is controlled by an electronic controller (not shown in the Figure).

The force on the back face of the valve head 115 is equal to the product of $P_x$ (VS apply pressure) and the area of the back face of the poppet valve 115, namely $A_v$. This force is cancelled out in the mechanism by the balancing force applied to the balance system 116. This balancing force is the product of the supply pressure $P_x$ and the area of the balancing piston $A_p$. Thus, the area of the balancing piston $A_p$ is chosen to be equal or substantially equal to the area $A_v$. Thus the force on the balancing piston 116 cancels out or substantially cancels out the force on the back face of the poppet valve 115.

Because of the force balance used in the valve mechanism, a very low valve spring force can be used and hence little work is required from the hydraulic actuator to operate the poppet valve 115.

In FIG. 3 there is shown an isolator valve 124. This valve can be used to retain air pressure in the valve stem chamber 117. It can be used to modify the balance between the opening force applied to the back face of the valve head 115A and the valve closing force acting on the underside of the balance piston 116. However, this isolating valve is optional and it could be that the duct 123 maintains permanent connection between the valve stem chamber 117 and the transfer passage 121 and therefore the same pressure is always applied to the back face of the valve head 115A and the balance piston 116.

As mentioned above two air seals 122 are required. One seal slides on the interface between the balance piston 116 and the surrounding chamber bore. One seal is stationary within the assembly of poppet valve 115, collet 125 and balance piston 116.

The chief advantage of the FIG. 3 mechanism is that lower hydraulic pressures (and thus less power) is required to enable the hydraulic actuator 120 to open the valve against the pre-load of the spring 119. Thus more energy is recovered (e.g during braking) without being wasted in the hydraulic actuator system.

As described above, the poppet valve 115 will be opened ideally when the pressure $P_p$ in cylinder 112 is equal to the gas pressure $P_x$ in the transfer passage 121, to minimise throttling (and hence pumping) losses and thus to maximise energy recovery.

The invention claimed is:

1. An engine comprising:
a variable volume chamber;
inlet valve means controlling admission of charge air into the variable volume chamber;
fuel delivery means for delivering fuel to be mixed with the charge air admitted to the variable volume chamber; and
exhaust valve means for controlling exhaust to atmosphere from the variable volume chamber of combusted gases resulting from combustion in the variable volume chamber of the fuel with the admitted charge air; wherein:
the engine has a first operating mode in which the inlet valve means admits charge air into the variable volume chamber, the fuel delivery means delivers fuel which is mixed with the admitted charge air, the mixture of fuel and charge air is compressed by the variable volume chamber reducing in volume, the compressed mixture of fuel and air combusts, the combusted gases expand and force the variable volume chamber to increase in volume and the expanded combusted gases are exhausted to atmosphere from the variable volume chamber via the exhaust valve means;

wherein the engine additionally comprises:

a reservoir for storing compressed air which is connected to the variable volume chamber; and gas flow control valve means controlling flow of air between the variable volume chamber and the reservoir for storing compressed air;

and wherein the engine has at least the following operating modes:

a second operating mode in which the inlet valve means admits charge air into the variable volume chamber, the admitted charge air is compressed by the variable volume chamber reducing in volume and the gas flow control valve means allows the compressed air to flow from the variable volume chamber to the reservoir to be stored therein; and a third operating mode in which the gas flow control valve means allows compressed air to flow from the reservoir into the variable volume chamber and thereafter expand to force the variable volume chamber to increase in volume, the expanded air subsequently being exhausted to atmosphere; and has a fourth operating mode in which the inlet valve means admits charge air into the variable volume chamber, the admitted charge air is compressed by the variable volume chamber reducing in volume and the exhaust valve means allows the compressed air to be exhausted to atmosphere; and the engine being characterised by a fifth operating mode in which: air or combusted gases is/are trapped in the variable volume chamber by closing all of the inlet valve means, the exhaust valve means and the gas flow control valve means, and in which the variable volume chamber with the trapped air or combusted gases operate(s) as a gas spring.

2. An engine as claimed in claim 1 wherein the expanded air is exhausted to atmosphere via the exhaust valve means.

3. An engine as claimed in claim 1 wherein the expanded air is exhausted to atmosphere via the inlet valve means.

4. An engine as claimed in claim 1, wherein the fuel delivery means is deactivated whilst the engine is operating in the fifth operating mode.

5. An engine as claimed in claim 1 wherein the fuel delivery means is deactivated whilst the engine is operating in the fourth operating mode.

6. An engine as claimed in claim 1 comprising additionally an engine-driven supercharger which pressurises the charge air admitted into the variable volume chamber via the inlet valve means.

7. An engine comprising:

a variable volume chamber;

inlet valve means controlling admission of charge air into the variable volume chamber;

fuel delivery means for delivering fuel to be mixed with the charge air admitted to the variable volume chamber; and exhaust valve means for controlling exhaust to atmosphere from the variable volume chamber of combusted gases resulting from combustion in the variable volume chamber of the fuel with the admitted charge air; wherein:

the engine has a first operating mode in which the inlet valve means admits charge air into the variable volume chamber, the fuel delivery means delivers fuel which is mixed with the admitted charge air, the mixture of fuel and charge air is compressed by the variable volume chamber reducing in volume, the compressed mixture of fuel and air combusts, the combusted gases expand and force the variable volume chamber to increase in volume and the expanded combusted gases are exhausted to atmosphere from the variable volume chamber via the exhaust valve means;

wherein the engine additionally comprises:

a reservoir for storing compressed air which is connected to the variable volume chamber; and gas flow control valve means controlling flow of air between the variable volume chamber and the reservoir for storing compressed air;

and wherein the engine has at least the following operating modes:

a second operating mode in which the inlet valve means admits charge air into the variable volume chamber, the admitted charge air is compressed by the variable volume chamber reducing in volume and the gas flow control valve means allows the compressed air to flow from the variable volume chamber to the reservoir to be stored therein;

a third operating mode in which the gas flow control valve means allows compressed air to flow from the reservoir into the variable volume chamber and thereafter expand to force the variable volume chamber to increase in volume, the expanded air subsequently being exhausted to atmosphere;

a fourth operating mode in which the inlet valve means admits charge air into the variable volume chamber, the admitted charge air is compressed by the variable volume chamber reducing in volume and the inlet valve means allows the compressed air to be exhausted to atmosphere; and the engine is characterised by a fifth operating mode in which: air or combusted gases is/are trapped in the variable volume chamber by closing all of the inlet valve means, the exhaust valve means and the gas flow control valve means, and in which the variable volume chamber with the trapped air or combusted gases operate(s) as a gas spring.

8. An engine as claimed in claim 7 wherein the expanded air is exhausted to atmosphere via the exhaust valve means.

9. An engine as claimed in claim 7 wherein the expanded air is exhausted to atmosphere via the inlet valve means.

10. An engine as claimed in claim 7 wherein the fuel delivery means is deactivated while the engine is operating in the fifth operating mode.

11. An engine as claimed in claim 7 wherein the fuel delivery means is deactivated whilst the engine is operating in the fourth operating mode.

12. An engine comprising:

a variable volume chamber;

inlet valve means controlling admission of charge air into the variable volume chamber;

fuel delivery means for delivering fuel to be mixed with the charge air admitted to the variable volume chamber; and exhaust valve means for controlling exhaust to atmosphere from the variable volume chamber of combusted gases resulting from combustion in the variable volume chamber of the fuel with the admitted charge air; wherein:

the engine has a first operating mode in which the inlet valve means admits charge air into the variable volume chamber, the fuel delivery means delivers fuel which is mixed with the admitted charge air, the mixture of fuel and charge air is compressed by the variable volume chamber reducing in volume, the compressed mixture of fuel and air combusts, the combusted gases expand and force the variable volume chamber to increase in volume and the expanded combusted gases are exhausted to atmosphere from the variable volume chamber via the exhaust valve means;

wherein the engine additionally comprises:

a reservoir for storing compressed air which is connected to the variable volume chamber; and gas flow control valve means controlling flow of air between the variable volume chamber and the reservoir for storing compressed air;

and wherein the engine has at least the following operating modes:

a second operating mode in which the inlet valve means admits charge air into the variable volume chamber, the admitted charge air is compressed by the variable volume chamber reducing in volume and the gas flow control valve means allows the compressed air to flow from the variable volume chamber to the reservoir to be stored therein; and a third operating mode in which the gas flow control valve means allows compressed air to flow from the reservoir into the variable volume chamber and thereafter expand to force the variable volume chamber to increase in volume, the expanded air subsequently being exhausted to atmosphere;

wherein when the engine is operating in the third operating mode then the engine can operate a two-stroke cycle with the gas flow control valve means admitting compressed air into the variable volume chamber during each downstroke; and wherein when the engine is operating in the third operating mode then the engine can operate a four-stroke cycle with an intake stroke in which the inlet valve means allows fresh charge air to be drawn into the variable volume chamber, a compression stroke in which the charge air admitted via the inlet valve means is compressed, a power stroke in which the gas flow control valve means admits compressed air into the variable volume chamber to supplement the air previously compressed in the compression stroke and an exhaust stroke in which expanded air is expelled from the variable volume chamber.

13. An engine as claimed in claim 12 wherein the fuel delivery means is deactivated whilst the engine is operating in the second operating mode.

14. An engine as claimed in claim 12 wherein the fuel delivery means is deactivated whilst the engine is operating in the third operating mode.

15. An engine as claimed in claim 12 wherein the air compressed in the variable volume chamber in the second operating mode of the engine is compressed to a pressure in the range 10 to 20 bar.

16. An engine as claimed in claim 12 wherein the reservoir comprises a light plastic pressure vessel.

17. An engine comprising:

a variable volume chamber;

inlet valve means controlling admission of charge air into the variable volume chamber;

fuel delivery means for delivering fuel to be mixed with the charge air admitted to the variable volume chamber; and exhaust valve means for controlling exhaust to atmosphere from the variable volume chamber of combusted gases resulting from combustion in the variable volume chamber of the fuel with the admitted charge air; wherein:

the engine has a first operating mode in which the inlet valve means admits charge air into the variable volume chamber, the fuel delivery means delivers fuel which is mixed with the admitted charge air, the mixture of fuel and charge air is compressed by the variable volume chamber reducing in volume, the compressed mixture of fuel and air combusts, the combusted gases expand and force the variable volume chamber to increase in volume and the expanded combusted gases are exhausted to atmosphere from the variable volume chamber via the exhaust valve means;

wherein the engine additionally comprises:

a reservoir for storing compressed air which is connected to the variable volume chamber; and gas flow control valve means controlling flow of air between the variable volume chamber and the reservoir for storing compressed air;

and wherein the engine has at least two additional operating modes:

a second operating mode in which the inlet valve means admits charge air into the variable volume chamber, the admitted charge air is compressed by the variable volume chamber reducing in volume and the gas flow control valve means allows the compressed air to flow from the variable volume chamber to the reservoir to be stored therein; and a third operating mode in which the gas flow control valve means allows compressed air to flow from the reservoir into the variable volume chamber and thereafter expand to force the variable volume chamber to increase in volume, the expanded air subsequently being exhausted to atmosphere; and characterised in that the engine comprises additionally a pump powered by the engine which receives compressed air expelled from the variable volume chamber and compresses the air further before the compressed air is delivered to the reservoir.

18. An engine as claimed in claim 17 wherein the pump raises the pressure of the compressed air from an initial pressure in the range 10 to 20 bar to a higher pressure of 100 to 100 bar.

19. An engine as claimed in claim 17 wherein the reservoir comprises a steel pressure vessel.

20. An engine comprising:

a variable volume chamber;

inlet valve means controlling admission of charge air into the variable volume chamber;

fuel delivery means for delivering fuel to be mixed with the charge air admitted to the variable volume chamber; and exhaust valve means for controlling exhaust to atmosphere from the variable volume chamber of combusted gases resulting from combustion in the variable volume chamber of the fuel with the admitted charge air; wherein:

the engine has a first operating mode in which the inlet valve means admits charge air into the variable volume chamber, the fuel delivery means delivers fuel which is mixed with the admitted charge air, the mixture of fuel and charge air is compressed by the variable volume chamber reducing in volume, the compressed mixture of fuel and air combusts, the combusted gases expand and force the variable volume chamber to increase in volume and the expanded combusted gases are exhausted to atmosphere from the variable volume chamber via the exhaust valve means;

wherein the engine additionally comprises:

a reservoir for storing compressed air which is connected to the variable volume chamber; and gas flow control valve means controlling flow of air between the variable volume chamber and the reservoir for storing compressed air;

and wherein the engine has at least two additional operating modes:

a second operating mode in which the inlet valve means admits charge air into the variable volume chamber, the admitted charge air is compressed by the variable volume chamber reducing in volume and the gas flow control valve means allows the compressed air to flow from the variable volume chamber to the reservoir to be stored therein; and a third operating mode in which the gas flow control valve means allows compressed air to flow from the reservoir into the variable volume chamber and thereafter expand to force the variable volume chamber to increase in volume, the expanded air subsequently being exhausted to atmosphere; and characterised in that the engine comprises additionally an electrically-driven turbocharger which pressurises the charge air admitted into the variable volume chamber via the inlet valve means.

21. An engine as claimed in claim 20, wherein the variable volume chamber is defined between a piston and a surrounding cylinder, the piston reciprocating in the cylinder and the piston being connected to a crankshaft of the engine.

22. An engine as claimed in claim 20 wherein each of the inlet valve means, the exhaust valve means and the gas flow control valve means comprises a valve operated by a hydraulic actuator individual to the valve and all of the hydraulic actuators are controlled by a common electronic controller, the electronic controller receiving signals from a plurality of sensors and the electronic controller varying operation of the hydraulic actuators and thereby operation of the valves in order to switch operation of the engine between the operating modes thereof.

23. A vehicle comprising an engine as claimed in claim 22 wherein the plurality of sensors includes sensors measuring parameters relating to motion of the vehicle and a sensor measuring pressure of air stored in the reservoir and wherein the electronic controller on detecting that the vehicle is decelerating whilst the reservoir is depleted varies operation of the hydraulic actuators so that the engine operates in the second operating mode.

24. A vehicle as claimed in claim 23 which has an automatic transmission with a variable gear ratio and wherein the electronic controller controls the transmission to lower the gear ratio when the vehicle is decelerating in order to increase revolutionary speed of the engine.

25. A vehicle comprising an engine as claimed in claim 23 wherein the plurality of sensors includes sensors measuring parameters relating to motion of the vehicle and a sensor measuring pressure of air stored in the reservoir and the electronic controller on detecting that the valve is decelerating whilst the reservoir is full varies operation of the hydraulic actuators so that the engine operates in the fourth operating mode.

26. A vehicle comprising an engine as claimed in claim 23 wherein the plurality of sensors includes sensors measuring parameters relating to motion of the vehicle and to requirements of a driver and the electronic controller on detecting that the vehicle is stationary and the driver wishes the vehicle to start moving controls operation of the hydraulic actuators so that the engine operates initially in the third operating mode and then, as speed of the vehicle increases, the operation of the hydraulic actuators is varied so that the engine switches to the first operating mode.

27. A vehicle as claimed in claim 26 wherein the vehicle commences motion without use of a clutch.

28. An engine comprising:

a plurality of variable volume chambers;

inlet valve means controlling admission of charge air into the variable volume chambers;

fuel delivery means for delivering fuel to be mixed with the charge air admitted to the variable volume chambers; and exhaust valve means for controlling exhaust to atmosphere from the variable volume chambers of combusted gases resulting from combustion in the variable volume chambers of the fuel with the admitted charge air; wherein the engine can operate at least one of the plurality of variable volume chambers in a plurality of different operating modes; and the engine can operate each variable volume chamber in a first operating mode in which the inlet valve means admits charge air into the variable volume chamber, the fuel delivery means delivers fuel which is mixed with the admitted charge air, the mixture of fuel and charge air is compressed by the variable volume chamber reducing in volume, the compressed mixture of fuel and air combusts, the combusted gases expand and force the variable volume chamber to increase in volume and the expanded combusted gases are exhausted to atmosphere from the variable volume chamber via the exhaust valve means;

wherein:

the engine additionally comprises:

a reservoir for storing compressed air which is connected to at least one of the plurality of variable volume chambers; and gas flow control valve means controlling flow of gas between at least one of the variable volume chambers and the reservoir for storing compressed air;

and wherein the engine can operate at least one of the plurality of variable volume chambers in at least two additional operating modes:

a second operating mode in which the inlet valve means admits charge air into the variable volume chamber, the admitted charge air is compressed by the variable volume chamber reducing in volume and the gas flow control valve means allows the compressed air to flow from the variable volume chamber to the reservoir to be stored therein;

a third operating mode in which the gas flow control valve means allows compressed air to flow from the reservoir into the variable volume chamber and thereafter expand to force the variable volume chamber to increase in volume, the expanded air subsequently being exhausted to atmosphere; and characterised in that the engine can simultaneously operate a first of the variable volume chambers according to the first operating mode while operating a second of the variable volume chambers according to the second operating mode whereby some of the work derived from the expansion of the combusted gases in the first variable volume chamber is used to compress air in the second variable volume chamber.

29. An engine as claimed in claim 28 wherein in the third operating mode the expanded air is exhausted to atmosphere via the exhaust valve means.

30. An engine as claimed in claim 28 wherein in the third operating mode the expanded air is exhausted to atmosphere via the inlet valve means.

31. An engine as claimed in claim 28 wherein each variable volume chamber is defined between a stationary element and a movable element and all of the movable elements are connected to a common power output mechanism whereby work derived from expansion of combusted gases can be output from the engine and also transferred between the movable elements.

32. An engine as claimed in claim 31 wherein the stationary elements are cylinders in a cylinder block and the movable elements are pistons which reciprocate one in each of the cylinders and the power output mechanism comprises a crankshaft to which all of the pistons are connected.

33. An engine as claimed in claim 28 wherein each of the inlet valve means, the exhaust valve means and the gas flow control valve means comprises a valve operated by a hydraulic actuator individual to the valve and all of the hydraulic actuators are controlled by a common electronic controller, the electronic controller receiving signals from a plurality of sensors and varying operation of the hydraulic actuators and thereby the valves in order to control the mode of operation of each variable volume chamber of the engine.

34. An engine as claimed in claim 33 wherein the plurality of sensors includes sensors measuring parameters relating to load on the engine and a sensor measuring pressure of air stored in the reservoir and the electronic controller on detecting that the engine is part loaded and that the reservoir is depleted controls operation of the hydraulic actuators so that at least a first variable volume chamber is operating in the first operating mode and delivering power output from the engine and at least a second variable volume chamber is operating in the second operating mode and compressing air for delivery to the reservoir.

35. An engine as claimed in claim 33 wherein the plurality of sensors includes sensors measuring parameters relating to load on the engine and a sensor measuring pressure of air stored in the reservoir and the electronic controller on detecting that the engine is part loaded and that the reservoir is full controls operation of the hydraulic actuators so that first variable volume chamber is operating in the first operating mode and delivering power output from the engine and at least a second variable volume chamber is deactivated by closing the inlet valve means, the exhaust valve means and the gas flow control valve means specific thereto with air or combusted gases trapped in the second variable volume chamber which thereby functions as a gas spring.

36. An engine as claimed in claim 28 wherein the plurality of variable volume chambers are interconnected by conduit means and when the engine is operating in the second operating mode then the admitted charge air admitted into the said variable valve chamber and compressed therein when allowed to flow from the chamber by the gas flow control volume means flows to at least a second variable valve chamber in which the air is compressed further before flowing to the variable volume chamber to be stored therein.

37. An engine comprising:
a plurality of variable volume chambers;
inlet valve means controlling admission of charge air into the variable volume chambers;
fuel delivery means for delivering fuel to be mixed with the charge air admitted to the variable volume chambers; and
exhaust valve means for controlling exhaust to atmosphere from the variable volume chambers of combusted gases resulting from combustion in the variable volume chambers of the fuel with the admitted charge air; wherein
the engine can operate at least one of the plurality of variable volume chambers in a plurality of different operating modes; and
the engine can operate each variable volume chamber in a first operating mode in which the inlet valve means admits charge air into the variable volume chamber, the fuel delivery means delivers fuel which is mixed with the admitted charge air, the mixture of fuel and charge air is compressed by the variable volume chamber reducing in volume, the compressed mixture of fuel and air combusts, the combusted gases expand and force the variable volume chamber to increase in volume and the expanded combusted gases are exhausted to atmosphere from the variable volume chamber via the exhaust valve means;
wherein:
the engine additionally comprises:
a reservoir for storing compressed air which is connected to at least one of the plurality of variable volume chambers; and
gas flow control valve means controlling flow of gas between at least one of the variable volume chambers and the reservoir for storing compressed air;
and wherein the engine can operate at least one of the plurality of variable volume chambers in at least two additional operating modes:
a second operating mode in which the inlet valve means admits charge air into the variable volume chamber, the admitted charge air is compressed by the variable volume chamber reducing in volume and the gas flow control valve means allows the compressed air to flow from the variable volume chamber to the reservoir to be stored therein; and
a third operating mode in which the gas flow control valve means allows compressed air to flow from the reservoir into the variable volume chamber and thereafter expand to force the variable volume chamber to increase in volume, the expanded air subsequently being exhausted to atmosphere; and
wherein each of the inlet valve means, the exhaust valve means and the gas flow control valve means comprises a valve operated by a hydraulic actuator individual to the valve and all of the hydraulic actuators are controlled by a common electronic controller, the electronic controller receiving signals from a plurality of sensors and varying operation of the hydraulic actuators and thereby the valves in order to control the mode of operation of each variable volume chamber of the engine; and
characterised in that the plurality of sensors includes sensors measuring parameters relating to load on the engine and a sensor measuring pressure of air stored in the reservoir and the electronic controller on detecting that the engine is part loaded and that the reservoir is full controls operation of the hydraulic actuators so that first variable volume chamber is operating in the first operating mode and delivering power output from the engine and at least a second variable volume chamber is deactivated by closing the inlet valve means, the exhaust valve means and the gas flow control valve means specific thereto with air or combusted gases trapped in the second variable volume chamber which thereby functions as a gas spring.

38. An engine as claimed in claim 37 wherein the plurality of variable volume chambers are interconnected by conduit means and when the engine is operating in the second operating mode then the admitted charge air admitted into the said variable valve chamber and compressed therein when allowed to flow from the chamber by the gas flow control volume means flows to at least a second variable valve chamber in which the air is compressed further before flowing to the variable volume chamber to be stored therein.

39. An engine comprising:
a plurality of variable volume chambers;
inlet valve means controlling admission of charge air into the variable volume chambers;
fuel delivery means for delivering fuel to be mixed with the charge air admitted to the variable volume chambers; and
exhaust valve means for controlling exhaust to atmosphere from the variable volume chambers of combusted gases resulting from combustion in the variable volume chambers of the fuel with the admitted charge air; wherein
the engine can operate at least one of the plurality of variable volume chambers in a plurality of different operating modes; and
the engine can operate each variable volume chamber in a first operating mode in which the inlet valve means admits charge air into the variable volume chamber, the fuel delivery means delivers fuel which is mixed with the admitted charge air, the mixture of fuel and charge air is compressed by the variable volume chamber reducing in volume, the compressed mixture of fuel and air combusts, the combusted gases expand and force the variable volume chamber to increase in volume and the expanded combusted gases are exhausted to atmosphere from the variable volume chamber via the exhaust valve means;
wherein:
the engine additionally comprises:
a reservoir for storing compressed air which is connected to at least one of the plurality of variable volume chambers; and
gas flow control valve means controlling flow of gas between at least one of the variable volume chambers and the reservoir for storing compressed air;
and wherein the engine can operate at least one of the plurality of variable volume chambers in at least two additional operating modes:
a second operating mode in which the inlet valve means admits charge air into the variable volume chamber, the admitted charge air is compressed by the variable volume chamber reducing in volume and the gas flow control valve means allows the compressed air to flow from the variable volume chamber to the reservoir to be stored therein; and
a third operating mode in which the gas flow control valve means allows compressed air to flow from the reservoir into the variable volume chamber and thereafter expand to force the variable volume chamber to increase in volume, the expanded air subsequently being exhausted to atmosphere; characterised in that:
the plurality of variable volume chambers are interconnected by conduit means and when the engine is operating in the third operating mode then the air expanded in said variable volume chamber is exhausted via the exhaust means to at least a second variable volume chamber for further expansion therein before the air is exhausted to atmosphere.

40. A valve mechanism for controlling flow of pressurised gas into an engine cylinder of an internal combustion engine, the mechanism comprising:
a poppet valve for opening and closing a transfer port in the cylinder through which gas can flow between a source of pressurised gas and the cylinder, the poppet valve having a valve head and a valve stem;
drive means acting on the valve stem for driving the poppet valve to open the transport port; and
spring means for biassing the poppet valve to close the transfer port; characterised in that:
on the valve stem there is mounted a piston which is slidable in a valve stem chamber provided in the internal combustion engine; and
the valve stem chamber is connected to the source of pressurised gas; whereby:
a force is applied to the piston by the pressurised gas in the valve stem chamber which counteracts a force applied on the poppet valve by exposure of a rear face of the valve head, facing away from the engine cylinder, to the pressurised gas from the source of pressurised gas.

41. A valve mechanism as claimed in claim 40 wherein sealing means is provided between the piston and the valve stem chamber to prevent escape of pressurised gas past the piston.

42. A valve mechanism as claimed in claim 40 comprising an isolating control valve operable to selectively connect and disconnect the valve stem chamber and the source of pressurised gas.

43. A valve mechanism as claimed of claim 40 wherein the spring means comprises a spring located in the valve stem chamber acting on the valve stem mounted piston.

44. A valve mechanism as claimed in claim 40 wherein the internal combustion engine has a transfer passage leading from the source of pressurised gas to the engine cylinder and opening into the engine cylinder via the transfer port; and the valve stem cylinder is connected to the transfer passage.

45. A valve mechanism as claimed in claim 40 wherein the drive means comprises a hydraulic actuator controlled by an electronic controller.

46. An internal combustion engine as claimed in claim 1 wherein the gas flow control valve further comprises the valve mechanism claim 40.

* * * * *